US009019257B2

(12) United States Patent
Huang

(10) Patent No.: US 9,019,257 B2
(45) Date of Patent: Apr. 28, 2015

(54) GATE DRIVING CIRCUIT OF DISPLAY PANEL

(75) Inventor: Chang-Xin Huang, Taipei (TW)

(73) Assignee: Chunghwa Picture Tubes, Ltd., Taoyuan (TW)

( * ) Notice: Subject to any disclaimer, the term of this patent is extended or adjusted under 35 U.S.C. 154(b) by 117 days.

(21) Appl. No.: 13/439,878

(22) Filed: Apr. 5, 2012

(65) Prior Publication Data

US 2013/0169614 A1 Jul. 4, 2013

(30) Foreign Application Priority Data

Dec. 28, 2011 (TW) ............................. 100149276 A

(51) Int. Cl.
*G06F 3/038* (2013.01)
*G09G 5/00* (2006.01)
*G09G 3/36* (2006.01)

(52) U.S. Cl.
CPC ............ *G09G 3/3696* (2013.01); *G09G 3/3677* (2013.01); *G09G 2300/0408* (2013.01); *G09G 2320/041* (2013.01); *G09G 2330/021* (2013.01)

(58) Field of Classification Search
CPC ................ G09G 2300/0408; G09G 2320/041; G09G 2330/021; G09G 3/3677; G09G 3/3696; G09G 5/00
USPC ................. 345/102, 690–691, 156–184, 204, 345/211–212; 349/72, 169
See application file for complete search history.

(56) References Cited

U.S. PATENT DOCUMENTS

| | | | | |
|---|---|---|---|---|
| 2005/0039465 | A1* | 2/2005 | Welch | 62/3.7 |
| 2008/0297104 | A1* | 12/2008 | Rao et al. | 320/106 |
| 2009/0110028 | A1* | 4/2009 | Goh et al. | 374/185 |
| 2010/0239299 | A1* | 9/2010 | Mori | 399/69 |

FOREIGN PATENT DOCUMENTS

| | | |
|---|---|---|
| CN | 1949119 | 4/2007 |
| CN | 101430231 | 5/2009 |
| JP | 64-020595 | 1/1989 |
| TW | 200737722 | 10/2007 |

OTHER PUBLICATIONS

"Office Action of Taiwan Counterpart Application" , issued on Jan. 14, 2014, p. 1-p. 5.
"Office Action of China Counterpart Application" , issued on Dec. 9, 2014, p. 1-p. 6.

* cited by examiner

*Primary Examiner* — Nitin Patel
*Assistant Examiner* — Insa Sadio
(74) *Attorney, Agent, or Firm* — Jianq Chyun IP Office

(57) ABSTRACT

A gate driving circuit of a display panel is provided. A gate driving voltage is accurately adjusted by the gate driving circuit according to an environmental temperature, given that the characteristics of a thermistor and a hysteresis loop are taken into consideration. Accordingly, the power loss caused by switching states of a display panel can be reduced.

7 Claims, 3 Drawing Sheets

GATE DRIVING CIRCUIT OF DISPLAY PANEL

CROSS-REFERENCE TO RELATED APPLICATION

This application claims the priority benefit of Taiwan application serial no. 100149276, filed on Dec. 28, 2011. The entirety of the above-mentioned patent application is hereby incorporated by reference herein and made a part of specification.

BACKGROUND OF THE INVENTION

1. Technical Field

The disclosure relates to a driving circuit, and more particularly, to a gate driving circuit of a display panel.

2. Related Art

Due to rapidly advancing semiconductor technologies in the recent years, portable electronics and flat panel displays have gained popularity. In various types of flat panel displays, liquid crystal displays (LCDs) have gradually become the mainstream of display products because of features including low voltage operation, non-radiation, light weight, compactness, and the like.

To lower down the manufacturing costs of LCDs, the gate driving circuits have been formed by manufacturers of display panels directly on the panels, and therefore it is no longer necessary to purchase gate driver ICs in order to assemble the panels. The panels in no need of the gate driver ICs are referred to as gate in panels (GIPs).

The gate of a pixel is conventionally designed to be driven by stable direct current or fixed square waves; however, said design is incompliant with the requirement of the GIPs for high threshold voltages. If the threshold voltage is set low, the start-up screen is apt to be abnormal; if the threshold voltage is set high, the power consumption becomes excessive.

A thermistor is sometimes applied for voltage adjustment. When a panel starts up and the temperature is relatively low, the voltage is raised; when the temperature is relatively high, the voltage is lowered down. Nonetheless, this design renders the gate voltage of the panel variable because the environmental conditions are changed. Thereby, the value of the gate voltage cannot remain optimal. From another perspective, the thermistor is inherently unstable and cannot be accurately controlled, thus leading to the floating phenomenon of the gate voltage of the panel.

SUMMARY OF THE INVENTION

The disclosure is directed to a gate driving circuit of a display panel. The gate driving circuit is capable of accurately adjusting a gate driving voltage according to variations in the environmental temperature.

In the disclosure, a gate driving circuit of a display panel is provided. The gate driving circuit includes a thermistor unit and a hysteresis circuit. The thermistor unit outputs a thermo-sensitive voltage according to an environmental temperature. The hysteresis circuit is coupled to the thermistor unit and outputs a gate driving voltage according to the thermo-sensitive voltage. When the environmental temperature rises to a first temperature, the gate driving voltage is switched to a low voltage level; when the environmental temperature is reduced to a second temperature, the gate driving voltage is switched to a high voltage level.

According to an embodiment of the disclosure, the first temperature is lower than the second temperature.

According to an embodiment of the disclosure, the thermistor unit includes a first resistor and a thermistor. The thermistor and the first resistor are serially connected between a source voltage and a ground, so as to generate the thermo-sensitive voltage at a common contact of the first resistor and the thermistor.

According to an embodiment of the disclosure, the hysteresis circuit includes a hysteresis amplifier and a feedback resistor. A positive input terminal of the hysteresis amplifier is coupled to the thermistor unit to receive the thermo-sensitive voltage. Besides, a negative input terminal of the hysteresis amplifier is coupled to a reference voltage. The feedback resistor is coupled between the positive input terminal and an output terminal of the hysteresis amplifier.

According to an embodiment of the disclosure, the hysteresis circuit includes an output resistor, a first voltage-dividing resistor, and a second voltage-dividing resistor. One terminal of the output resistor is coupled to the output terminal of the hysteresis amplifier. The first voltage-dividing resistor is coupled between an operating voltage source and the other terminal of the output resistor. The second voltage-dividing resistor is coupled between a ground and the other terminal of the output resistor. The gate driving voltage is generated at a common contact of the first voltage-dividing resistor and the second voltage-dividing resistor.

According to an embodiment of a disclosure, the gate driving circuit further includes a delay unit. The delay unit is coupled between the output terminal of the thermistor unit and a ground and delays a variation speed of the thermo-sensitive voltage.

According to an embodiment of the disclosure, the delay unit is a capacitor coupled between the output terminal of the thermistor unit and the ground.

According to an embodiment of the disclosure, the hysteresis circuit includes a second resistor, a bipolar transistor, a feedback resistor, a first voltage-dividing resistor, and a second voltage-dividing resistor. One terminal of the second resistor is coupled to a source voltage. A base of the bipolar transistor is coupled to the thermistor unit to receive the thermo-sensitive voltage, and a collector of the bipolar transistor is coupled to the other terminal of the second resistor. The feedback resistor is coupled between the other terminal of the second resistor and the base of the bipolar transistor. The first voltage-dividing resistor is coupled between an operating voltage source and an emitter of the bipolar transistor. The second voltage-dividing resistor is coupled between a ground and the emitter of the bipolar transistor, and the gate driving voltage is generated at a common contact of the first voltage-dividing resistor and the second voltage-dividing resistor.

Based on the above, the gate driving voltage in the disclosure is accurately adjusted according to the environmental temperature in consideration of characteristics of the thermistor and the hysteresis loop, so as to reduce power loss caused by switching states.

Several exemplary embodiments accompanied with figures are described in detail below to further describe the disclosure in details.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DETAILED DESCRIPTION OF DISCLOSED EXEMPLARY EMBODIMENTS

Figure 1:
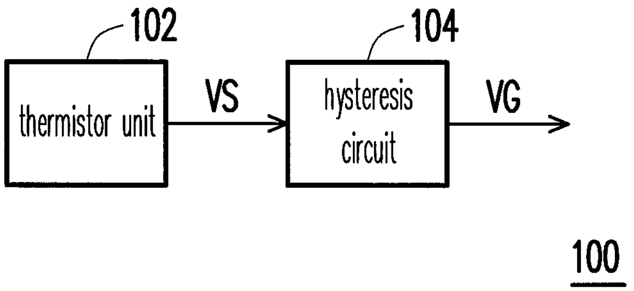
FIG. 1 is a schematic view illustrating a gate driving circuit of a display panel according to an embodiment of the disclosure.

FIG. 1 is a schematic view illustrating a gate driving circuit of a display panel according to an embodiment of the disclosure. With reference to FIG. 1, the gate driving circuit 100 includes a thermistor unit 102 and a hysteresis circuit 104. The thermistor unit 102 is coupled to the hysteresis circuit 104 and outputs a thermo-sensitive voltage VS according to an environmental temperature. The hysteresis circuit 104 outputs a gate driving voltage VG to a gate of a display pixel according to the thermo-sensitive voltage VS and further controls the display pixel to display an image.

Figure 2:
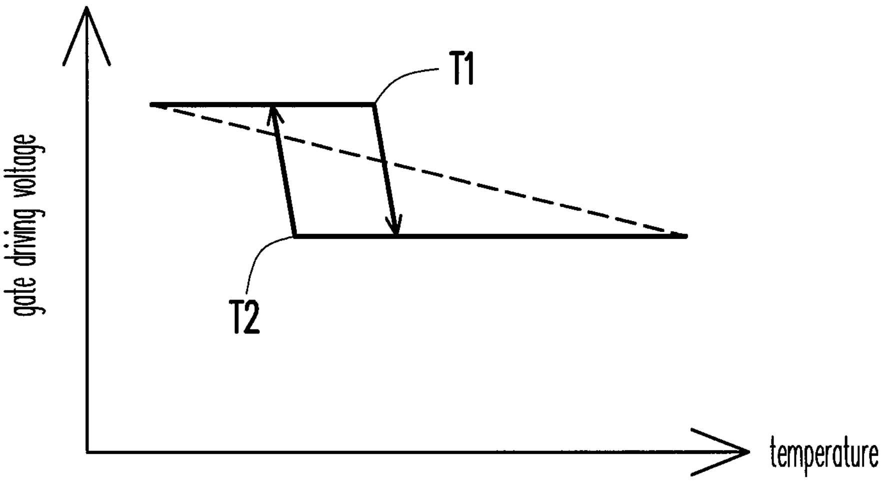
FIG. 2 shows a relationship between an environmental temperature and a gate driving voltage.

FIG. 2 shows a relationship between an environmental temperature and a gate driving voltage. Solid lines in FIG. 2 are curves indicating that the gate driving voltage VG varies together with changes to the environmental temperature, while dotted lines are curves indicating variations in the gate driving voltage that is output by the thermistor and used by the conventional gate driving circuits. As shown in FIG. 2, when the environmental temperature rises to a first temperature T1, the gate driving voltage VG of the present embodiment is switched from a high voltage level to a low voltage level; when the environmental temperature is reduced to a second temperature T2, the gate driving voltage VG is switched to the high voltage level. Here, the first temperature T1 is greater than the second temperature T2.

Thereby, it is likely to meet the requirements of the display panel for raising the voltage when the display panel starts up and the temperature is relatively low and for reducing the voltage after the display panel already starts up and the temperature is relatively high. Further, the issue of abnormal start-up screen or excessive power consumption can be precluded. The threshold voltage of the hysteresis loop is different when the temperature is raised from low to high and when the temperature is lowered from high to low. Hence, when the gate driving voltage corresponding to the environmental temperature approximates to the threshold voltages of the display pixel, the issue of the increased power consumption caused by the frequent state switching of the display pixel can be resolved.

Figure 3:
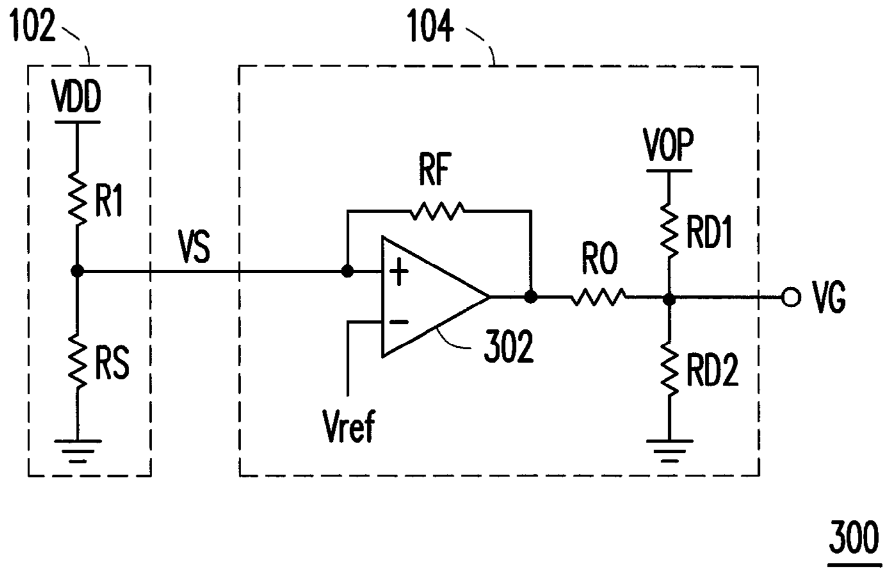
FIG. 3 is a schematic view illustrating a gate driving circuit of a display panel according to another embodiment of the disclosure.

FIG. 3 is a schematic view illustrating a gate driving circuit of a display panel according to another embodiment of the disclosure. With reference to FIG. 3, in the present embodiment, the thermistor unit 102 of the gate driving circuit 300 may include a resistor R1 and a thermistor RS which are serially connected between a source voltage VDD and a ground. The resistance of the thermistor RS varies together with changes to the environmental temperature, thus leading to variations in the thermo-sensitive voltage VS at the common contact of the resistor R1 and the thermistor RS. In the present embodiment, the resistor R1 is coupled to the source voltage VDD, and the thermistor RS is coupled to the ground. However, this should not be construed as a limitation to the invention. The resistor R1 can be coupled to the ground, and the thermistor RS can be coupled to the source voltage VDD.

In addition, the hysteresis circuit 104 may include a hysteresis amplifier 302, a feedback resistor RF, an output resistor RO, a first voltage-dividing resistor RD1, and a second voltage-dividing resistor RD2. A positive input terminal of the hysteresis amplifier 302 is coupled to the common contact of the resistor R1 and the thermistor RS to receive the thermo-sensitive voltage VS, while a negative input terminal of the hysteresis amplifier 302 is coupled to a reference voltage Vref. An output terminal of the hysteresis amplifier 302 is coupled to one terminal of the output resistor RO, and the other terminal of the output resistor RO is coupled to a common contact of the first voltage-dividing resistor RD1 and the second voltage-dividing resistor RD2. The first voltage-dividing resistor RD1 and the second voltage-dividing resistor RD2 are serially connected between an operating voltage source VOP and the ground, and the gate driving voltage VG is generated at the common contact of the first voltage-dividing resistor RD1 and the second voltage-dividing resistor RD2.

When the environmental temperature is relatively low (e.g., when the display panel just starts up), the thermistor RS is affected by the environmental temperature and thus has a relatively low resistance. Thereby, the source voltage VDD, after being divided by the resistor R1 and the thermistor RS, generates a relatively low thermo-sensitive voltage VS at the common contact of the resistor R1 and the thermistor RS. After the thermo-sensitive voltage VS is received by the positive input terminal of the hysteresis amplifier 302, the hysteresis amplifier 302 compares the thermo-sensitive voltage VS with the reference voltage Vref at the negative input terminal of the hysteresis amplifier 302. At this time, the thermo-sensitive voltage VS is lower than the reference voltage Vref, and therefore the voltage at the output terminal of the hysteresis amplifier 302 is at the low voltage level. The output resistor RO can then be equivalent to being connected in parallel to the second voltage-dividing resistor RD2; thereby, the gate driving voltage VG at the common contact of the first voltage-dividing resistor RD 1 and the second voltage-dividing resistor RD2 is raised, so as to comply with the high voltage level requirement when the display panel starts up.

After the display panel completely starts up, the temperature of the display panel gradually increases, and the thermistor RS is affected by the environmental temperature and thus has a relatively high resistance. As such, a relatively high thermo-sensitive voltage VS is generated at the common contact of the resistor R1 and the thermistor RS. Similarly, the hysteresis amplifier 302 compares the thermo-sensitive voltage VS with the reference voltage Vref at the negative input terminal of the hysteresis amplifier 302. At this time, the thermo-sensitive voltage VS is higher than the reference voltage Vref, and therefore the voltage at the output terminal of the hysteresis amplifier 302 is at the high voltage level. The output resistor RO can then be equivalent to being connected in parallel to the first voltage-dividing resistor RD1; thereby, the gate driving voltage VG at the common contact of the first voltage-dividing resistor RD1 and the second voltage-dividing resistor RD2 is reduced, so as to comply with the low voltage level requirement after the display panel starts up and operates in a normal manner.

As described above, in consideration of both the resistor of the thermistor RS which can sense temperature changes and the characteristics of the hysteresis loop of the hysteresis amplifier 302, the voltage requirement of the display panel can be satisfied when the display panel starts up and after the display panel completely starts up and operates in a normal manner. In the meantime, when the gate driving voltage VG corresponding to the environmental temperature approximates to the threshold voltage of the display pixel, the issue of the increased power consumption caused by the frequent state switching of the display pixel can be resolved.

Figure 4:
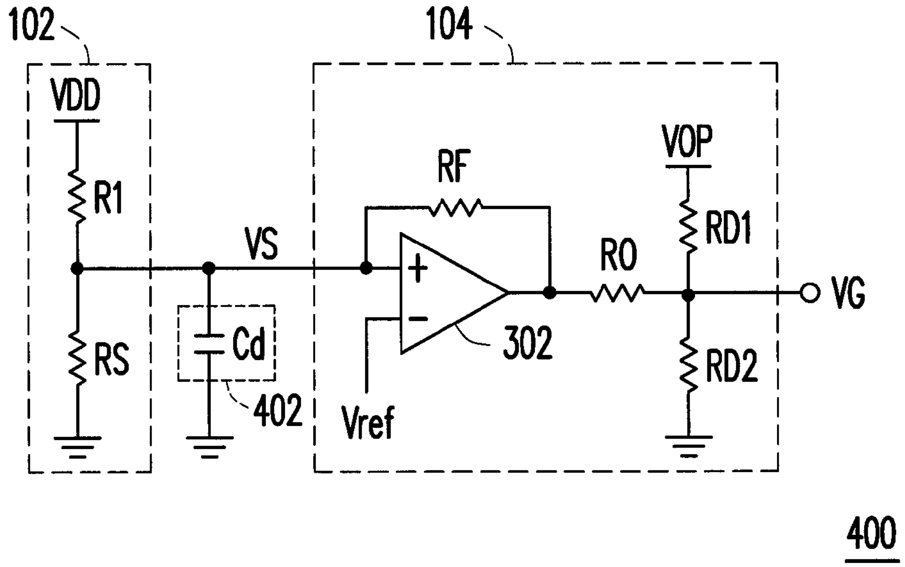
FIG. 4 is a schematic view illustrating a gate driving circuit of a display panel according to another embodiment of the disclosure.

FIG. 4 is a schematic view illustrating a gate driving circuit of a display panel according to another embodiment of the disclosure. With reference to FIG. 4, the difference between the gate driving circuit 400 described herein and the gate driving circuit 300 depicted in FIG. 3 lies in that the gate driving circuit 400 further includes a delay unit 402. The delay unit 402 is coupled between the output terminal of the thermistor unit 102 and a ground for delaying an increasing speed or a decreasing speed of the thermo-sensitive voltage VS. Thereby, variations in the gate driving voltage VG can meet actual requirements for circuit applications. According to the present embodiment, the delay unit 402 may be implemented in form of a capacitor Cd, which should not be construed as a limitation when the delay unit 402 is actually applied. The capacitor Cd is coupled between the output terminal of the thermistor unit 102 and the ground.

Figure 5:
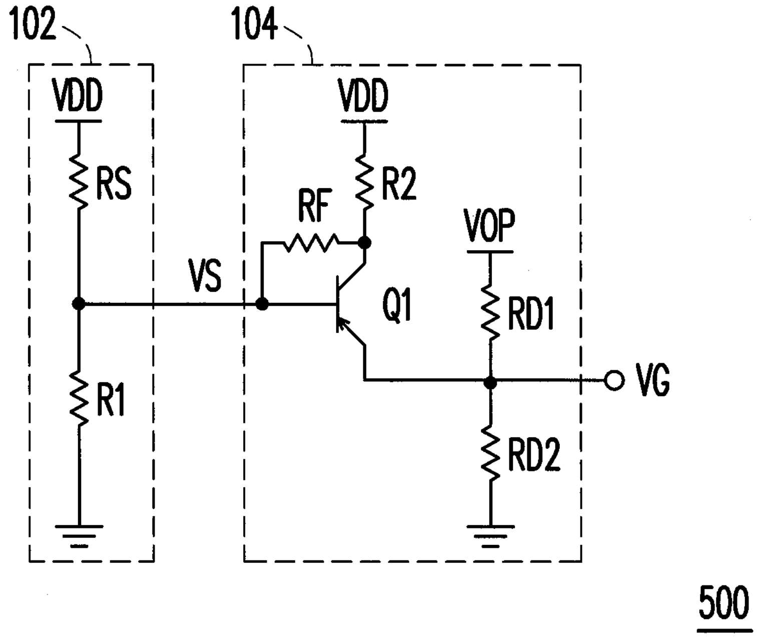
FIG. 5 is a schematic view illustrating a gate driving circuit of a display panel according to another embodiment of the disclosure.

FIG. 5 is a schematic view illustrating a gate driving circuit of a display panel according to another embodiment of the disclosure. With reference to FIG. 5, the difference between the gate driving circuit 500 described herein and the gate driving circuit 300 depicted in FIG. 3 lies in that the hysteresis circuit 104 of the driving circuit 500 in the present embodiment is implemented in form of a resistor R2, a bipolar transistor Q1, a feedback resistor RF, a first voltage-dividing resistor RD1, and a second voltage-dividing resistor RD2. The resistor R2 is coupled between a collector of the bipolar transistor Q1 and the source voltage VDD. The feedback resistor RF is coupled between the collector and a base of the bipolar transistor Q1. The base of the bipolar transistor Q1 is coupled to the common contact of the resistor R1 and the thermistor RS to receive the thermo-sensitive voltage VS. The first voltage-dividing resistor RD1 and the second voltage-dividing resistor RD2 are serially connected between the operating voltage source VOP and the ground, and the common contact of the first voltage-dividing resistor RD1 and the second voltage-dividing resistor RD2 is coupled to the emitter of the bipolar transistor Q1. Besides, the coupling relationship of the resistor R1 in the thermistor unit 102 and the thermistor RS in the present embodiment is opposite to that shown in FIG. 3. Namely, the resistor R1 is coupled to the ground, and the thermistor RS is coupled to the source voltage VDD.

Similarly, when the environmental temperature is relatively low (e.g., when the display panel just starts up), the thermistor RS is affected by the environmental temperature and thus has a relatively low resistance. Thereby, the thermo-sensitive voltage VS at the common contact of the resistor R1 and the thermistor RS is relatively low. The greater the voltage difference between the base and the emitter of the bipolar transistor Q1, the greater the resistance between the collector and the emitter of the bipolar transistor Q1. Hence, the bipolar transistor Q1 at this time has high resistance. Thereby, the connection between the collector and the emitter of the bipolar transistor Q1 is deemed broken, i.e., the bipolar transistor Q1 and the resistor R2 may be ignored. The value of the gate driving voltage VG is determined by the first voltage-dividing resistor RD1 and the second voltage-dividing resistor RD2, so as to raise the gate driving voltage VG and thus comply with the high voltage level requirement when the display panel starts up.

After the display panel completely starts up, the temperature of the display panel gradually increases, and the thermistor RS is affected by the environmental temperature and thus has a relatively high resistance. As such, a relatively high thermo-sensitive voltage VS is generated at the common contact of the resistor R1 and the thermistor RS. At this time, the resistance of the bipolar transistor Q1 is reduced, and thus the resistor R2 can be equivalent to being connected in parallel to the first voltage-dividing resistor RD1; thereby, the gate driving voltage VG at the common contact of the first voltage-dividing resistor RD 1 and the second voltage-dividing resistor RD2 is reduced, so as to comply with the low voltage level requirement after the display panel starts up and operates in a normal manner.

To sum up, the gate driving voltage is adjusted according to the characteristics of the hysteresis loop, so as to comply with the requirements of the display panel for raising the voltage when the display panel starts up and the temperature is relatively low and for reducing the voltage after the display panel already starts up and the temperature increases. Further, the issue of abnormal start-up screen or excessive power consumption can be precluded. Moreover, the threshold voltage of the hysteresis loop is different when the temperature is raised from low to high and when the temperature is lowered from high to low. Hence, when the gate driving voltage corresponding to the environmental temperature approximates to the threshold voltage of the display pixel, the issue of the increased power consumption caused by the frequent state switching of the display pixel can be resolved.

It will be apparent to those skilled in the art that various modifications and variations can be made to the structure of the disclosure without departing from the scope or spirit of the disclosure. In view of the foregoing, it is intended that the disclosure cover modifications and variations of this disclosure provided they fall within the scope of the following claims and their equivalents.

What is claimed is:

1. A gate driving circuit of a display panel, comprising:

a thermistor unit outputting a thereto-sensitive voltage according to an environmental temperature; and a hysteresis circuit coupled to the thermistor unit and outputting a gate driving voltage according to the thereto-sensitive voltage, wherein the hysteresis circuit switches the gate driving voltage from a high voltage level to a low voltage level when the environmental temperature rises to a first temperature, and the hysteresis circuit switches the gate driving voltage from the low voltage level to the high voltage level when the environmental temperature lowers to a second temperature, so as to raise the gate driving voltage when the display panel starts up and lower the gate driving voltage after the display panel already starts up, wherein a voltage corresponding to the first temperature is larger than a voltage corresponding to the second temperature.

2. The gate driving circuit of the display panel as recited in claim 1, wherein the thermistor unit comprises:

a first resistor; and a thermistor, wherein the thermistor and the first resistor are serially connected between a source voltage and a ground, so as to generate the thermo-sensitive voltage at a common contact of the first resistor and the thermistor.

3. The gate driving circuit of the display panel as recited in claim 1, wherein the hysteresis circuit comprises:

a hysteresis amplifier, a positive input terminal of the hysteresis amplifier being coupled to the thermistor unit to receive the thermo-sensitive voltage, a negative input terminal of the hysteresis amplifier being coupled to a reference voltage; and a feedback resistor coupled between the positive input terminal and an output terminal of the hysteresis amplifier.

4. The gate driving circuit of the display panel as recited in claim 3, wherein the hysteresis circuit further comprises:

an output resistor, one terminal of the output resistor being coupled to the output terminal of the hysteresis amplifier;

a first voltage-dividing resistor coupled between an operating voltage source and the other terminal of the output resistor; and a second voltage-dividing resistor coupled between a ground and the other terminal of the output resistor, the gate driving voltage being generated at a common contact of the first voltage-dividing resistor and the second voltage-dividing resistor.

5. The gate driving circuit of the display panel as recited in claim 1, further comprising:

a delay unit coupled between the output terminal of the thermistor unit and a ground and delaying a variation speed of the thermo-sensitive voltage.

6. The gate driving circuit of the display panel as recited in claim 1, wherein the delay unit is a capacitor coupled between the output terminal of the thermistor unit and the ground.

7. The gate driving circuit of the display panel as recited in claim 1, wherein the hysteresis circuit comprises:

a second resistor, one terminal of the second resistor being coupled to a source voltage;

a bipolar transistor, a base of the bipolar transistor being coupled to the thermistor unit to receive the thermo-sensitive voltage, a collector of the bipolar transistor being coupled to the other terminal of the second resistor;

a feedback resistor coupled between the other terminal of the second resistor and the base of the bipolar transistor;

a first voltage-dividing resistor coupled between an operating voltage source and an emitter of the bipolar transistor; and a second voltage-dividing resistor coupled between a ground and the emitter of the bipolar transistor, the gate driving voltage being generated at a common contact of the first voltage-dividing resistor and the second voltage-dividing resistor.

* * * * *